(12) United States Patent
Weirauch

(10) Patent No.: US 8,339,920 B2
(45) Date of Patent: Dec. 25, 2012

(54) OPTICAL STORAGE MEDIUM WITH OPTICALLY DETECTABLE MARKS

(75) Inventor: Charles R. Weirauch, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2400 days.

(21) Appl. No.: 10/618,115

(22) Filed: Jul. 10, 2003

(65) Prior Publication Data
US 2005/0007926 A1    Jan. 13, 2005

(51) Int. Cl.
*G11B 7/00* (2006.01)

(52) U.S. Cl. ............ 369/59.25; 369/47.55; 369/272.1

(58) Field of Classification Search ............ None
See application file for complete search history.

(56) References Cited

U.S. PATENT DOCUMENTS

| | | | |
|---|---|---|---|
| 4,583,208 A | 4/1986 | Verboom | |
| 4,989,195 A | 1/1991 | Suzuki | |
| 5,119,363 A * | 6/1992 | Satoh et al. | 369/275.3 |
| 5,684,773 A * | 11/1997 | Hayashi | 369/47.35 |
| 6,278,672 B1 * | 8/2001 | Kobayashi | 369/53.23 |
| 6,600,716 B1 * | 7/2003 | Kondo | 369/275.3 |
| 6,772,429 B2 * | 8/2004 | Yoon et al. | 720/718 |
| 6,788,633 B2 | 9/2004 | Shimamura | |
| 2002/0021633 A1 | 2/2002 | Shimamura | |

FOREIGN PATENT DOCUMENTS

| | | |
|---|---|---|
| EP | 1026671 | 8/2000 |
| EP | 1026671 B1 | 8/2000 |
| EP | 1035539 | 9/2000 |
| EP | 1035539 A1 | 9/2000 |
| JP | 60160082 | 8/1985 |
| JP | 07-226012 | 8/1995 |
| JP | 07-334867 | 12/1995 |
| JP | 11045461 | 2/1999 |
| JP | 11213532 | 8/1999 |
| JP | 2001202655 | 7/2001 |
| JP | 2002056544 | 2/2002 |
| JP | 2002036726 | 6/2002 |

OTHER PUBLICATIONS

UK Search report dated Feb. 22, 2005.

\* cited by examiner

*Primary Examiner* — Joseph Haley

(57) ABSTRACT

Optically detectable marks readable by a wide range of optical systems are included on an optical storage medium. Among other uses, the marks may be used to determine the type of the optical storage medium in an optical device capable of reading multiple types of optical storage media.

23 Claims, 10 Drawing Sheets

OPTICAL STORAGE MEDIUM WITH OPTICALLY DETECTABLE MARKS

FIELD OF THE INVENTION

The present invention relates generally to optical storage technology and more specifically to optical devices capable of reading multiple types of optical storage media.

BACKGROUND OF THE INVENTION

Optical storage technology has evolved from the compact disc (CD) and laser disc (LD) to far denser types such as digital versatile disc (DVD) and blue laser formats such as Blu-ray. Many optical devices capable of reading the newer, denser media types are also designed to read lower capacity media types such as CDs. This backward compatibility comes at a price, however, because the low- and high-density media types require optical systems having different parameters such as numerical aperture (NA) and laser diode wavelength ($\lambda$). An optical device capable of reading multiple media types must, therefore, adjust (focus) the various optical systems (combinations of laser and optics) in succession until it finds the correct one for a particular optical disc. In such optical devices, the start-up time increases with the number of optical storage media types supported.

It is thus apparent that there is a need in the art for an improved indication to enhance the detection of the type of an optical storage medium or other necessary information.

SUMMARY OF THE INVENTION

Methods for rendering detectable and determining the type of an optical storage medium or other necessary information are provided. An optical storage medium and an optical device for carrying out the methods are also provided.

Other aspects and advantages of the present invention will become apparent from the following detailed description, taken in conjunction with the accompanying drawings, illustrating by way of example the principles of the invention.

DETAILED DESCRIPTION OF THE INVENTION

One or more optically detectable marks readable under sub-optimal focus and radial position conditions by a wide range of optical systems having different parameters such as numerical aperture (NA) and laser diode wavelength ($\lambda$) may be included on an optical storage medium. Among other uses, such marks allow the type of an optical storage medium to be determined directly, without the delay incurred in a trial-and-error approach. Some ways in which such marks may be created and used are discussed in the balance of this detailed description. In addition to communicating the type of an optical storage medium, such optically detectable marks may be used to convey other necessary information. Throughout this description, "optical storage medium" denotes any kind of read-only, writable, or re-writable optical storage technology, including, but not limited to, compact discs (CDs), digital versatile discs (DVDs), Blu-ray discs, and advanced optical discs (AODs).

Figure 1A:
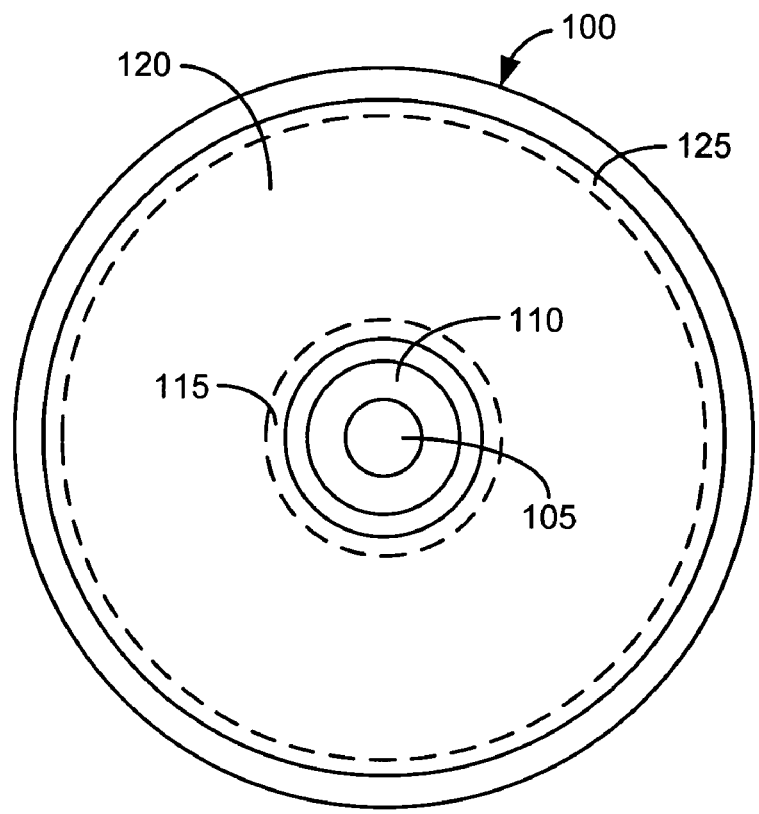
FIG. 1A is an illustration showing some areas of an optical storage medium in accordance with an illustrative embodiment of the invention

FIG. 1A is an illustration showing some areas of an optical storage medium 100 in accordance with an illustrative embodiment of the invention. In this particular embodiment, optical storage medium 100 comprises a circular optical disc. Optical storage medium 100 includes a hole 105, clamping area 110, lead-in area 115, user-data area 120, and lead-out area 125. User-data area 120 stores digital information such as audio, video, computer files, or a combination thereof. Lead-in area 115 and lead-out area 125 are part of the non-user-data area of optical storage medium 100. Lead-in area 115 may, for example, store information about the disc's contents. Lead-out area 125 may, for example, signal to an optical device that the end of the data stored on the disc has been reached.

Figure 1B:
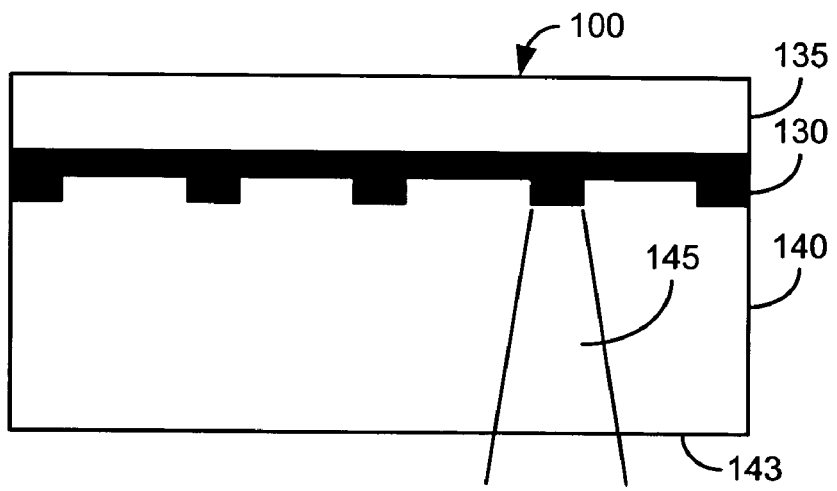
FIG. 1B is an illustration of a cross section of an optical storage medium in accordance with an illustrative embodiment of the invention.

FIG. 1B is an illustration of a cross section of optical storage medium 100 in accordance with an illustrative embodiment of the invention. Optical storage medium 100 comprises at least one data layer 130 surrounded by a protective layer 135 and a polycarbonate plastic substrate 140 having a surface 143. In general, optical storage medium 100 may have one or more buried layers (layers beneath surface 143), which may be data layers 130 or non-data layers (not shown in FIG. 1B). Laser beam 145 focuses on data layer 130 as optical storage medium 100 spins at a rate controlled by a spindle motor. Data layer 130 includes a reflective metal coating, which allows the optical system of an optical device to read encoded digital information by detecting the change in reflectivity as the disc spins beneath laser beam 145. The particular type of optical storage medium 100 depicted in FIG. 1B is a read-only optical disc such as a commercial CD, but other types of optical storage media 100 such as DVDs and writable or re-writable optical discs are also comprised of a substrate and at least one data layer 130. Some newer types of optical storage media 100 have two readable sides instead of one (e.g., a two-sided DVD) and/or multiple data layers 130 per side (e.g., a dual-layer DVD).

Figure 1C:
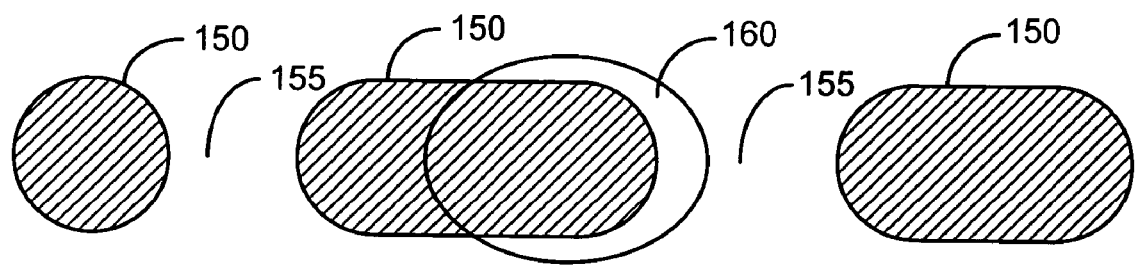
FIG. 1C is an illustration showing marked areas (pits) and lands (unmarked areas) on a data layer of an optical storage medium in accordance with an illustrative embodiment of the invention.

FIG. 1C is an illustration of the marked areas (pits) 150 and unmarked areas (lands) 155 on data layer 130 of optical storage medium 100 in accordance with an illustrative embodiment of the invention. The pits 150 and lands 155 depicted in FIG. 1C are associated with a data layer 130 (e.g., video, audio, computer data, or a combination thereof) of optical storage medium 100. FIG. 1C is a top view of data layer 130 as seen from the laser side of optical storage medium 100. Also shown in FIG. 1C is the laser focus spot 160 that passes over the pits 150 and lands 155 as an optical device reads optical storage medium 100. Data is typically encoded on optical storage media using a non-return-to-zero (NRZ) code and either pulse-width modulation (PWM) or pulse-position modulation (PPM), although PWM is more common than PPM.

Figure 2A:
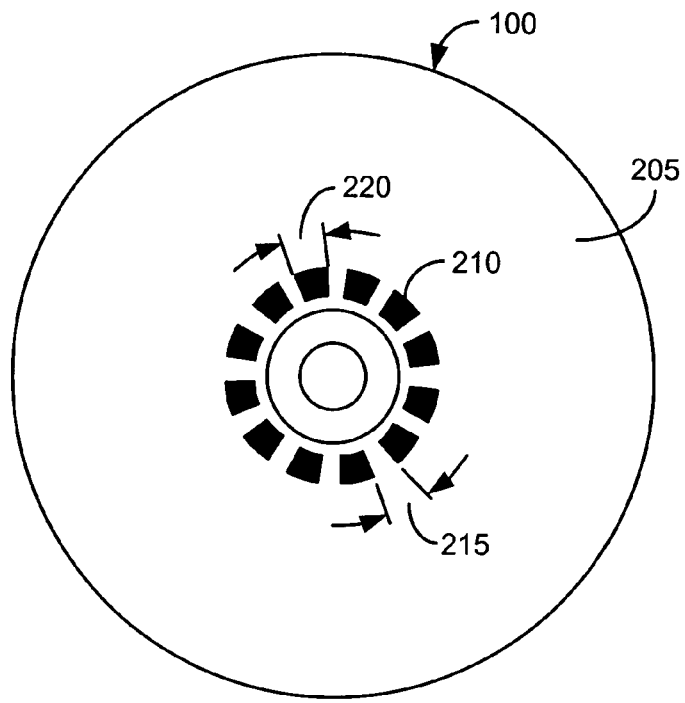
FIG. 2A is an illustration of optically detectable marks on an optical storage medium in accordance with an illustrative embodiment of the invention.

FIG. 2A is an illustration of optically detectable marks 210 on optical storage medium 100 in accordance with an illustrative embodiment of the invention. In this embodiment, optical storage medium 100 comprises a disk-like body 205 and at least one optically detectable mark 210 ("mark") that is readable by a wide range of optical systems configured for different types of optical storage media. For example, marks 210 may be read by an optical device configured for CDs, DVDs, Blu-ray discs, AODs, or other types of optical storage media. Marks 210 that are appropriately sized and spaced may be detected even though the laser beam 145 of a given optical system cannot focus properly on a data layer 130 of a particular optical storage medium 100 being identified due to optical system issues or the lens being in a fixed position. Additionally, the radial size of marks 210 eliminates the need for radial tracking.

Marks 210 may be arranged and employed in a variety of ways. For example, as few as one optically detectable mark 210 may be included on optical storage medium 100, or a number sufficient to form a partial or complete band around a circle concentric with the circumference of optical storage medium 100 may be included, as shown in FIG. 2A. Also, marks 210 may be uniformly spaced as in FIG. 2A or non-uniformly spaced. Further, marks 210 may be of uniform or non-uniform size. Finally, marks 210 may be located in any non-user-data area of optical storage medium 100, including lead-in and lead-out areas 115 and 125, respectively. In the illustrative embodiment shown in FIG. 2A, marks 210 are in lead-in area 115 of optical storage medium 100. One use for marks 210 is to indicate the type (e.g., CD, DVD, etc.) of optical storage medium 100. For example, the spacing 215 between marks 210, the size (e.g., width 220) of one or more marks 210, or a combination of the two may convey such information or other necessary information. Where the size of marks 210 is employed, width 220, radial length, or both may be included in the measurements.

In FIG. 2A, the size of marks 210 has been exaggerated for clarity. In practice, an acceptable size for marks 210 is determined primarily by the NA and λ of the optical system and the allowed level of defocus or the range of the radial position, as those skilled in the art will recognize. Also, the spacing 215 between marks 210 may be made sufficient for the marks 210 to be detectable by an optical system achieving a largest (worst-case) expected laser focus spot 160 with the corresponding amount of spot aberration. In one embodiment, for example, marks 210 may be on the order of 1-3 mm in width, depending on whether marks 210 are on the surface 143 of optical storage medium 100 or at a buried layer (e.g., a data layer 130 or a non-data buried layer) thereof. More will be said about ways in which marks 210 may be created in a later portion of this description.

Figure 2B:
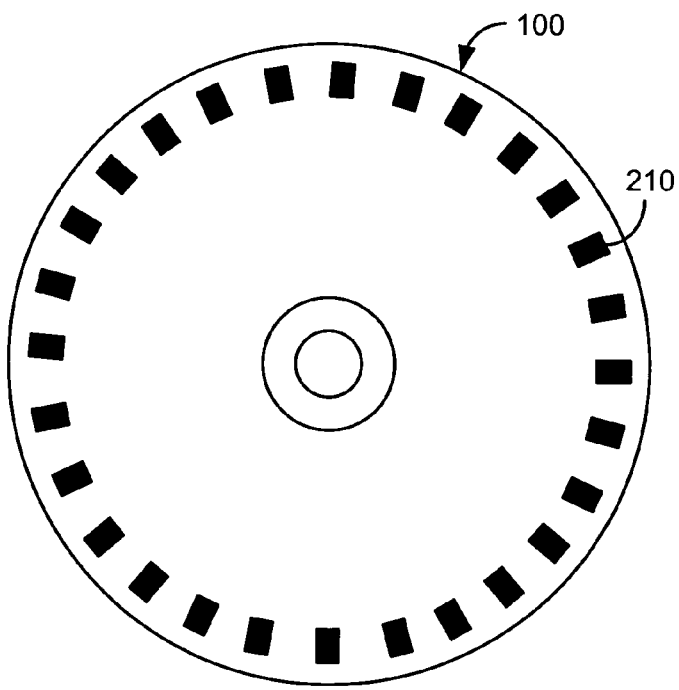
FIG. 2B is an illustration of optically detectable marks on an optical storage medium in accordance with another illustrative embodiment of the invention.

FIG. 2B is an illustration of an optical storage medium 100 in accordance with another illustrative embodiment of the invention. FIG. 2B illustrates that marks 210 may be uniform in width along an axis coinciding with a radius of optical storage medium 100 instead of being shaped like sectors of an annulus as in FIG. 2A. Other shapes are possible and are all within the intended scope of the claimed invention. For example, marks 210 may be trapezoidal in shape. FIG. 2B further illustrates that marks 210 may be located in lead-out area 125 of optical storage medium 100 instead of lead-in area 115.

There are a variety of ways in which marks 210 may be included on optical storage medium 100. In one embodiment, marks 210 may be embossed on a data layer 130 of optical storage medium 100 in a manner similar to that in which digital data is stored on the medium. To ensure the marks are large enough in the radial direction, multiple spiral "tracks" may be packed closely together. In this embodiment, marks 210 may be defined as either pits 150 or lands 155, and they may be represented and interpreted using PWM, PPM, or any other suitable technique.

Figure 2C:
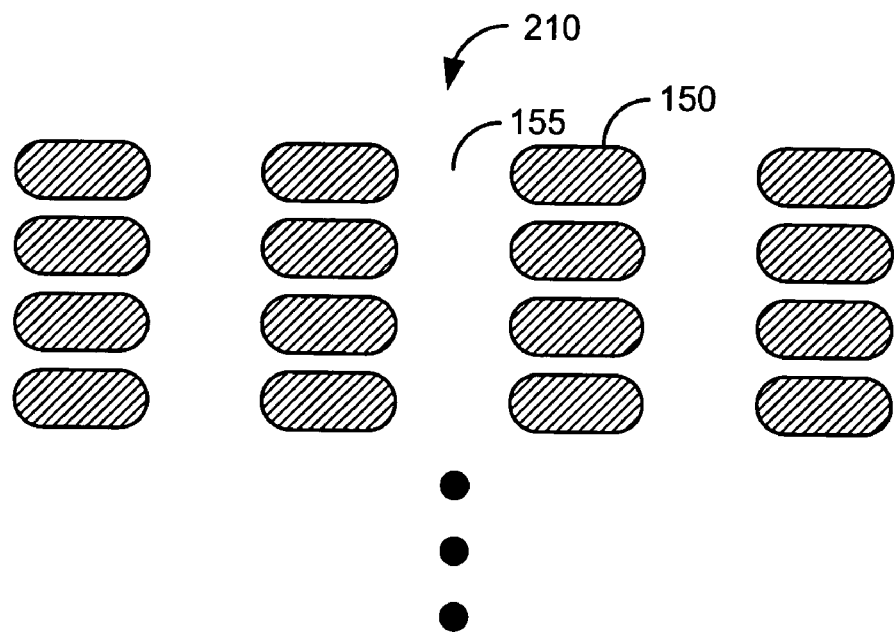
FIGS. 2C-2F are illustrations of different approaches to forming optically detectable marks on an optical storage medium in accordance with various illustrative embodiments of the invention.
Figure 2D:
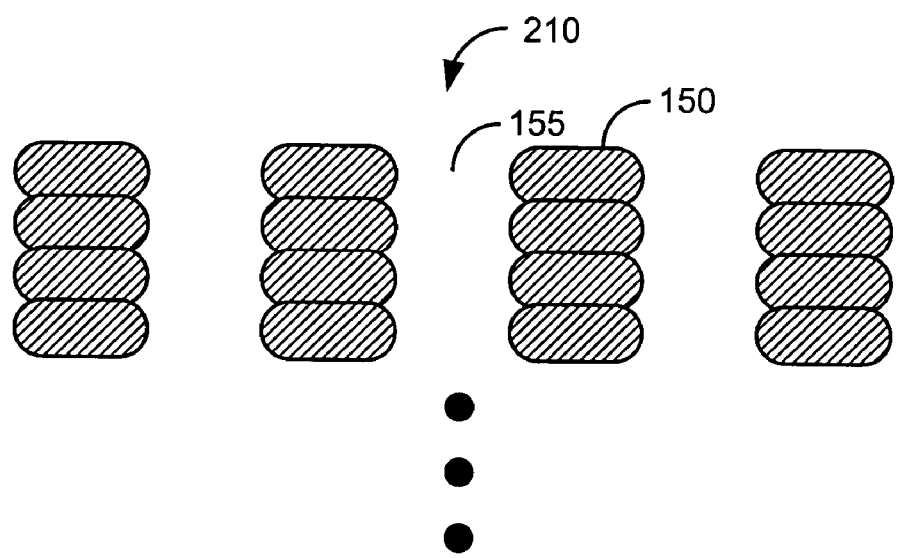
Figure 2E:
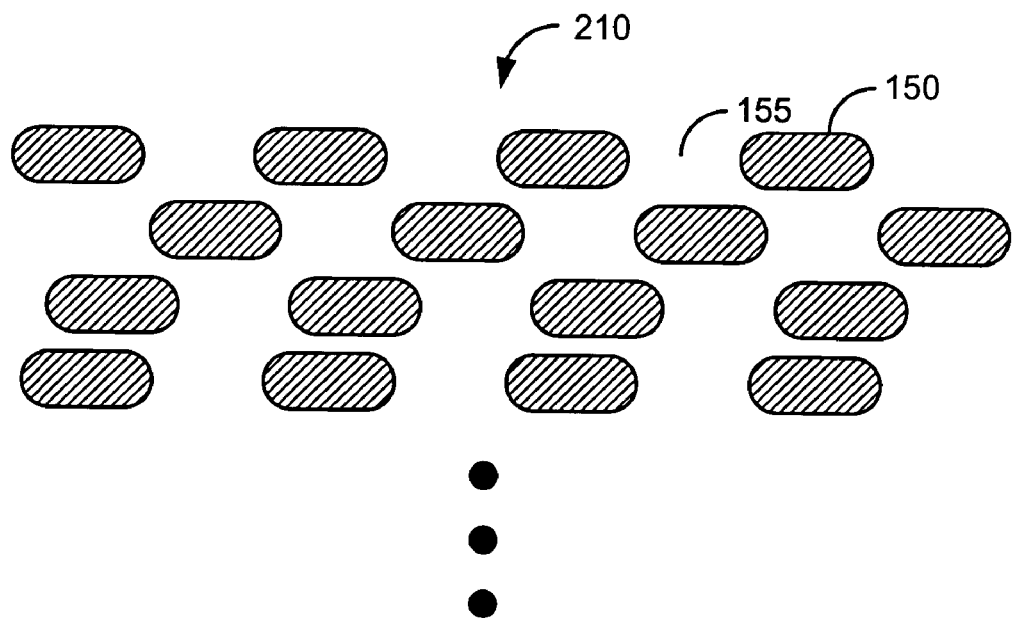
Figure 2F:
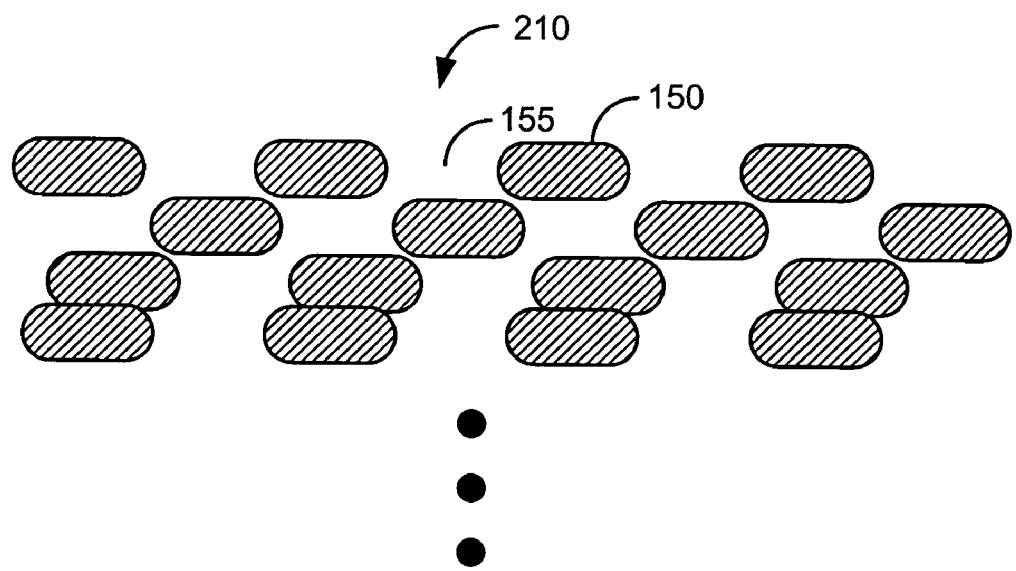
Figure 2G:
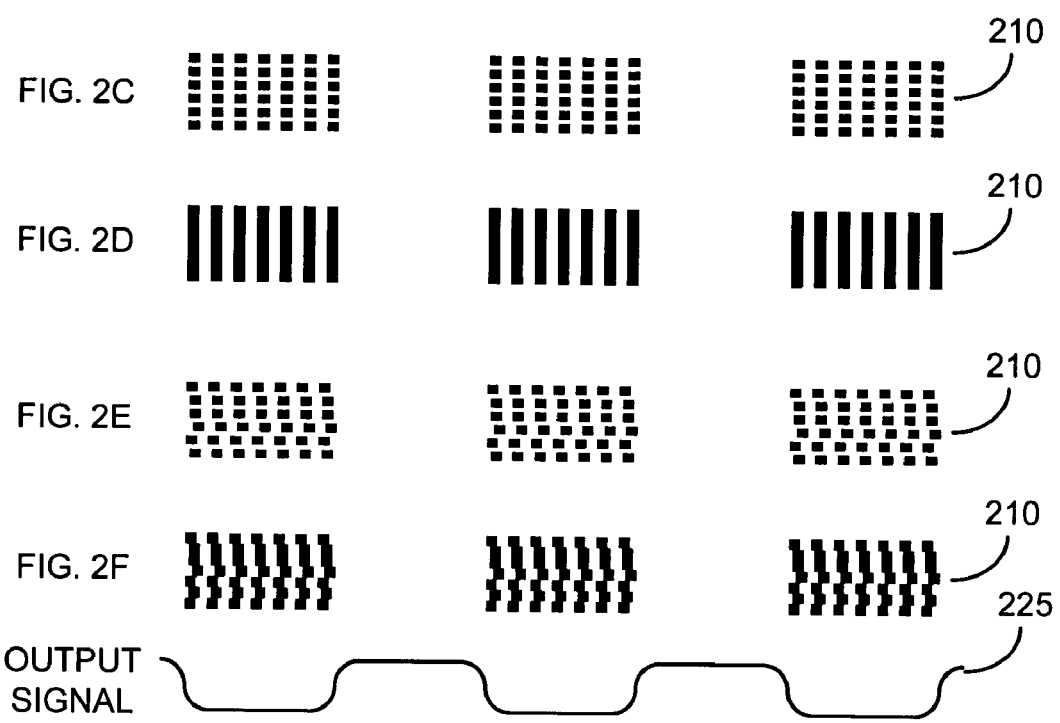
FIG. 2G is an illustration showing, in accordance with various illustrative embodiments of the invention, that the different approaches shown in FIGS. 2C-2G produce an equivalent optical system output.

FIGS. 2C-2F illustrate different ways in which pits and lands may be arranged to form a sufficiently large mark 210 on optical storage medium 100. In FIG. 2C, the tracks are spaced somewhat apart, and the lands forming mark 210 are radially aligned. In FIG. 2D, the tracks are adjoining, and the lands forming mark 210 are radially aligned. In FIG. 2E, the tracks are spaced somewhat apart, and the lands forming mark 210 are not radially aligned. In FIG. 2F, the tracks are adjoining, and the lands forming mark 210 are not radially aligned. FIG. 2G illustrates that, no matter which of the approaches in FIGS. 2C-2F is employed, an optical system of an optical device reading mark 210 produces an equivalent output signal 225, although some low-pass filtering of the output signal may be necessary to achieve the waveform shown in FIG. 2G.

In another embodiment, marks 210 may be screen printed on surface 143 of optical storage medium 100 or on some other surface of optical storage medium 100, including a buried layer. An optical system may detect a screen-printed mark 210 by measuring the drop in reflectivity along mark 210. Instead of screen printing marks 210 on optical storage medium 100, an ink-jet process may be used. In yet another embodiment, a portion of the metal reflective coating of data layer 130 of optical storage medium 100 may be ablated (evaporated away) by a high-power laser. Those skilled in the art will recognize that this technique is used in the burst-cutting area of read-only DVDs.

Figure 2H:
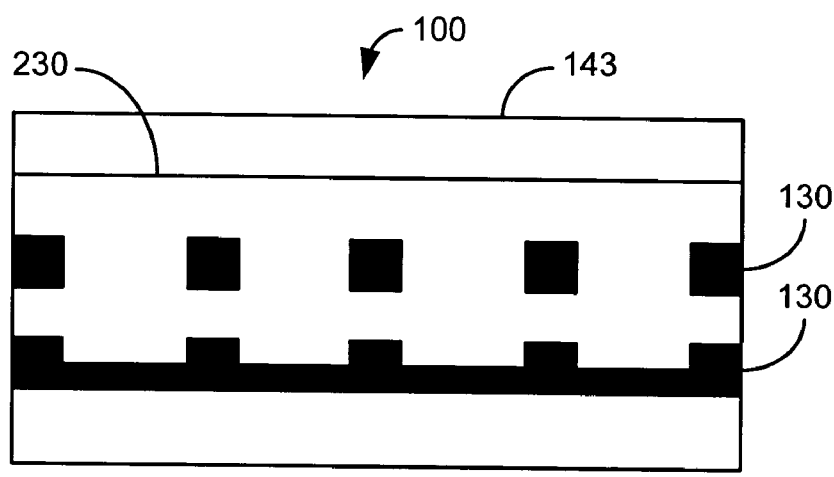
FIG. 2H is an illustration showing various layers of an optical storage medium on which optically detectable marks may be placed in accordance with various illustrative embodiments of the invention.

FIG. 2H summarizes that marks 210 may be located on surface 143, a non-data buried layer 230, or on one or more data layers 130 of optical storage medium 100. In some embodiments, non-data buried layer 230 may be between two data layers 130.

Figure 3:
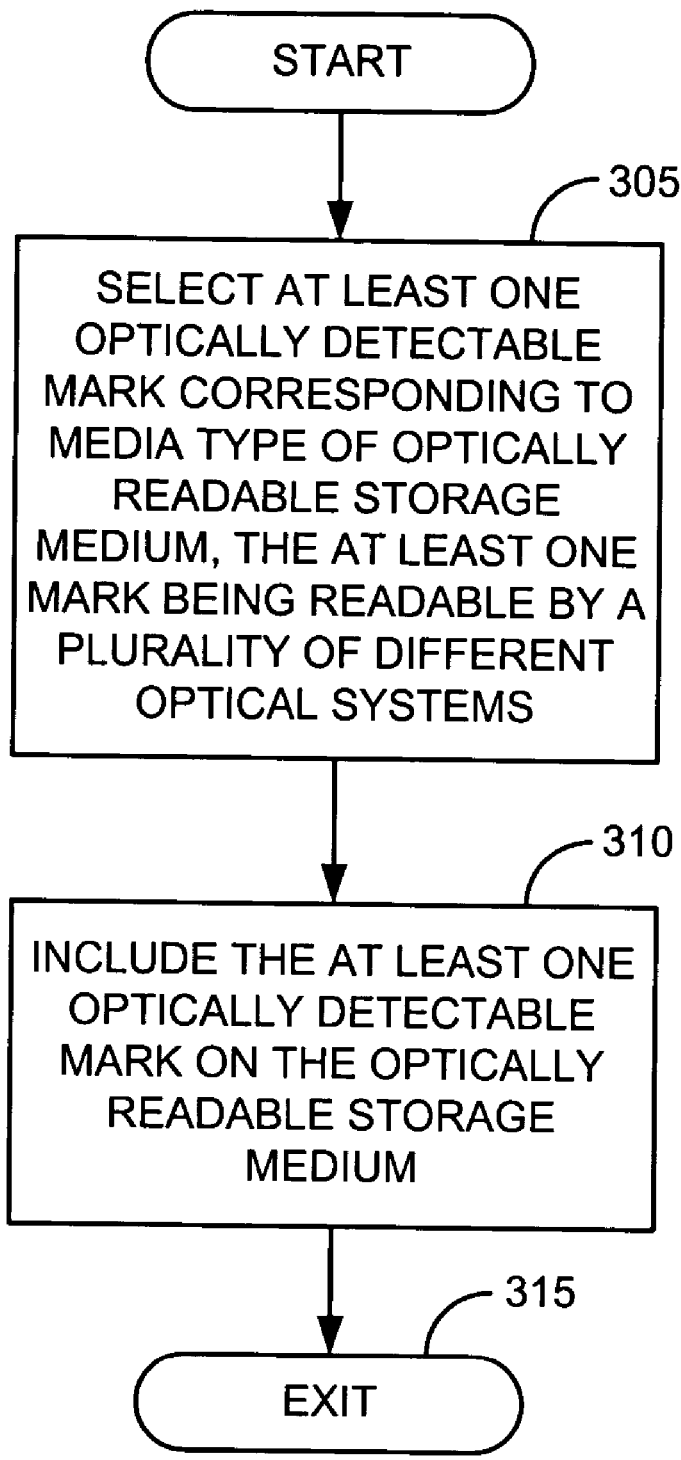
FIG. 3 is a flowchart of a method for rendering detectable the type of an optical storage medium in accordance with an illustrative embodiment of the invention.

FIG. 3 is a flowchart of a method for rendering detectable the type of an optical storage medium 100 in accordance with an illustrative embodiment of the invention. At 305, at least one mark 210 corresponding to the type of an optical storage medium 100 is selected. This selection may be based upon a prior mapping of various media types to the size (e.g., width 220) and/or their spacing 215 of marks 210, as explained above. For example, a complete band of marks 210 in the lead-in portion of optical storage medium 100 at a predetermined uniform spacing may indicate a Blu-ray disc. At 310, the selected mark or marks 210 are included on optical storage medium 100, as explained above. At 315, the process terminates.

Figure 4:
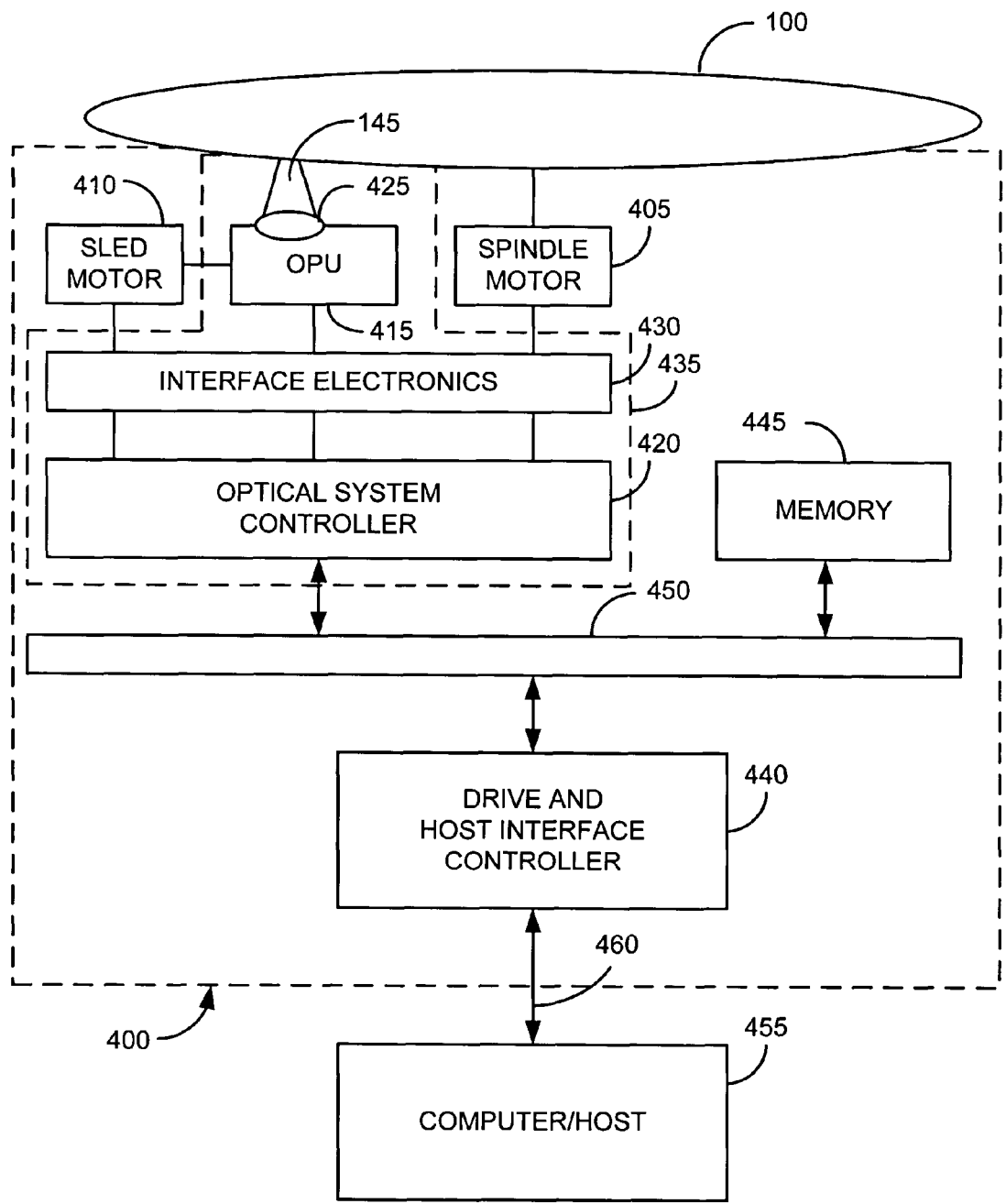
FIG. 4 is a functional block diagram of an optical device in accordance with an illustrative embodiment of the invention.

FIG. 4 is a functional block diagram of an optical device 400 in accordance with an illustrative embodiment of the invention. Optical device 400 may be any device capable of at least reading one or more types of optical storage media. For example, optical device 400 may be a CD device, a DVD device, a computer optical drive, or any similar device. In FIG. 4, optical storage medium 100 is mounted or attached to spindle motor 405, which rotates optical storage medium 100. Sled motor 410 positions optical pickup unit (OPU) 415 at the approximate radius determined by optical system controller 420. OPU 415 contains an objective lens 425 and the electromechanical means to position objective lens 425 at the correct radial and vertical positions to focus laser beam 145 to the appropriate spot size on optical storage medium 100. Additionally, OPU 415 contains a laser diode, photo detectors, and additional optical components (not shown in FIG. 4) to create laser beam 145 or read the reflected laser beam 145 from optical storage medium 100. Interface electronics 430 converts signals between optical system controller 420 and sled motor 410, OPU 415, and spindle motor 405 between digital and analog formats. For the purposes of this description, OPU 415, optical system controller 420, objective lens 425, and interface electronics 430 will be referred to collectively as optical system 435.

Optical system controller 420 typically includes data decoding and formatting logic implemented as either hardware or firmware. Optical system controller 420 may also contain logic ("mark interpretation logic") for interpreting marks 210. For example, optical system controller 420 may contain logic for recognizing the type of optical storage medium 100 or other useful information conveyed by marks 210. Typically, information from optical system controller 420 is exchanged with drive and host interface controller 440 using memory 445 via an internal bus 450. Drive and host interface controller 440 maintains communication and exchanges user and system data for reading and writing optical storage medium 100 with computer 455 via a physical connection 460, such as IDE, SCSI, IEEE 1394 or USB. Information exchanged between optical device 400 and computer 455 may be stored temporarily in memory 445.

Figure 5:
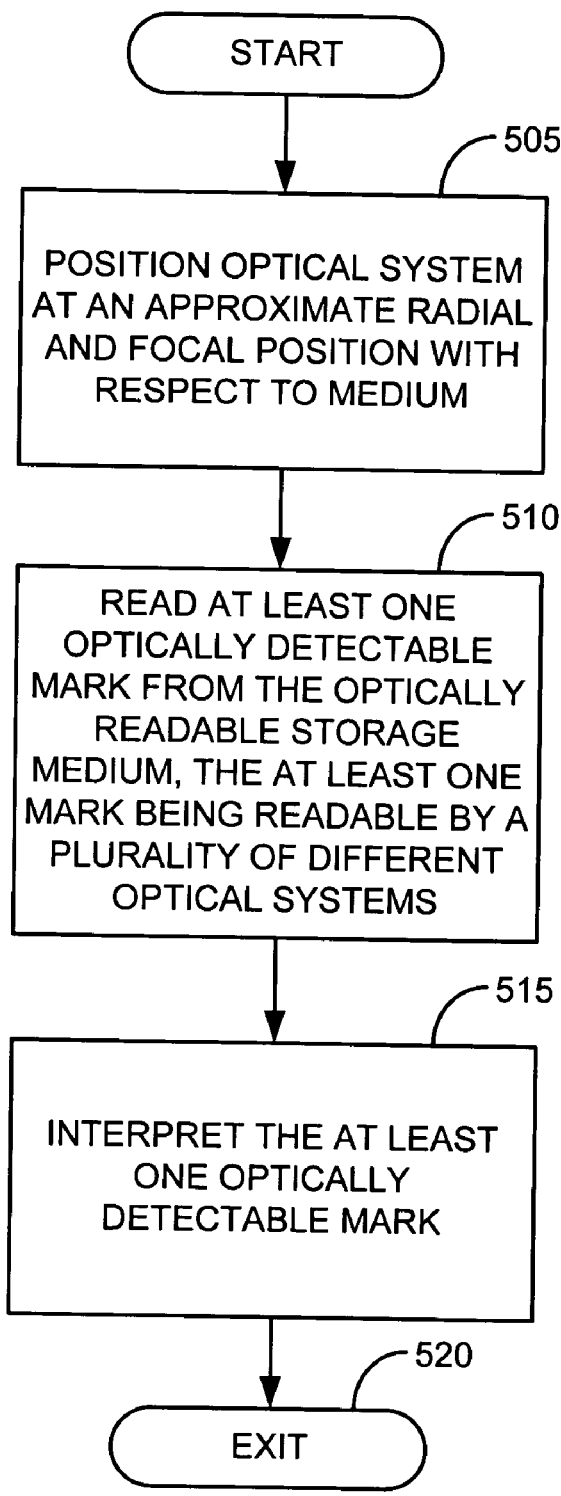
FIG. 5 is a flowchart of the operation of the optical device shown in FIG. 4 in accordance with an illustrative embodiment of the invention.
Figure 6:
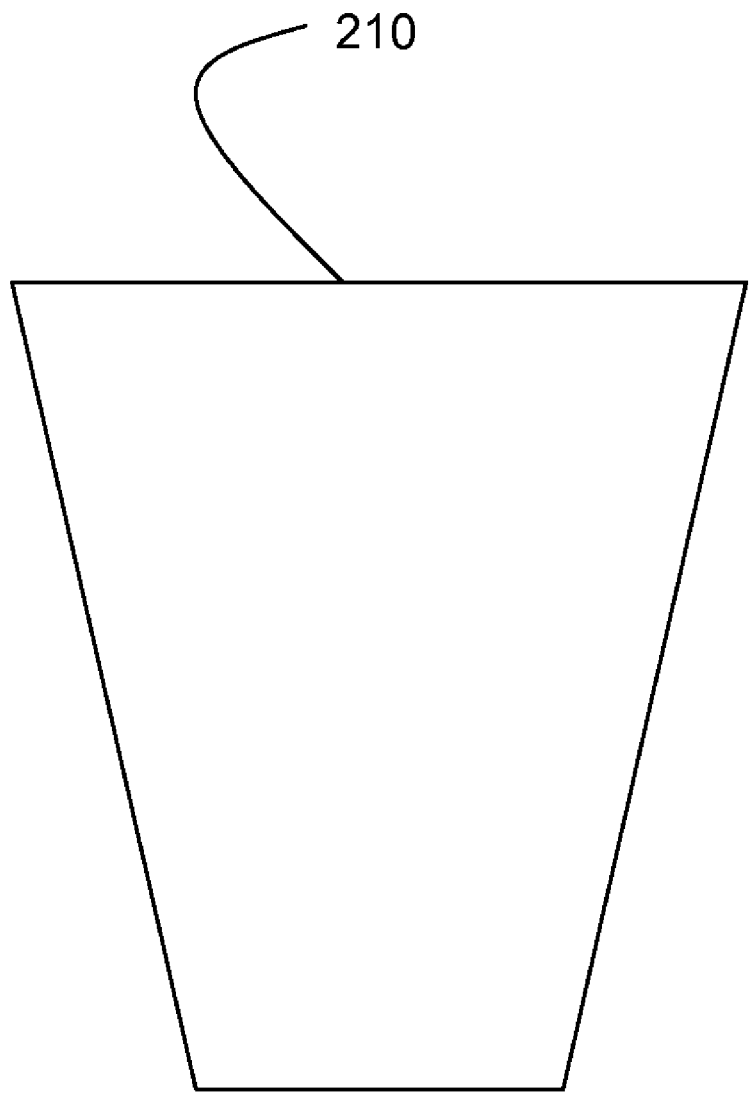
FIG. 6 is an illustration showing a trapezoidal shaped optically detectable mark according to an embodiment.

FIG. 5 is a flowchart of the operation of optical device 400 shown in FIG. 4 in accordance with an illustrative embodiment of the invention. After optical storage medium 100 is inserted and mounted in optical device 400, optical system controller 420 causes sled motor 410 to move OPU 415 to a specified radius, spindle motor 405 to rotate optical storage medium 100 at a specified angular velocity, and objective lens 425 to move to a specified fixed position at 505. Marks 210 are sized radially to allow for some degree of tolerance for the positional accuracy of optical system 435. At 510, the resulting laser beam 145 is reflected from optical storage medium 100 to the photo detectors in OPU 415. At 515, the mark interpretation logic of optical system controller 420 may interpret the information contained in at least one mark 210 and pass that information to the drive and host interface controller 440, which in turn communicates the information to computer 455. For example, optical system controller 420 may interpret the at least one mark 210 to determine the type of optical storage medium 100. At 520, the process terminates.

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An optical storage medium, comprising:
a disk-like body of a particular type; and
a plurality of optically detectable marks in a non-user-data-area of the disk-like body, the optically detectable marks being readable by a plurality of different optical systems configured for different types of optical storage media;
wherein the plurality of optically detectable marks indicate said type and are larger than marks in a user-data area of the disk-like body.

2. The optical storage medium of claim 1, wherein the optically detectable marks are located on a buried layer of the optical storage medium.

3. The optical storage medium of claim 2, wherein the buried layer is a non-data layer of the optical storage medium.

4. The optical storage medium of claim 2, wherein the buried layer is a data layer of the optical storage medium.

5. The optical storage medium of claim 1, wherein the optically detectable marks are located on a surface of the optical storage medium.

6. The optical storage medium of claim 1, wherein the non-user-data area comprises a lead-in area of the optical storage medium.

7. The optical storage medium of claim 1, wherein the non-user-data area comprises a lead-out area of the optical storage medium.

8. The optical storage medium of claim 1, wherein the optically detectable marks are uniform in width along an axis coinciding with a radius of the optical storage medium.

9. The optical storage medium of claim 1, wherein the optically detectable marks are shaped approximately like a sector of an annulus.

10. The optical storage medium of claim 1, wherein the spacings between optically detectable marks are indicate the type of optical storage medium.

11. A method for determining the type of an optical storage medium, comprising:
reading, from a non-user-data area of the optical storage medium using an optical system, a plurality of optically detectable marks that are readable by a plurality of different optical systems configured for different types of optical storage media, the marks indicating the type of the optical storage medium; and
interpreting the optically detectable marks to identify the type of the optical storage medium.

12. The method of claim 11, wherein the optical storage medium comprises a circular disc and the optically detectable marks comprise a band of optically detectable marks disposed around a circle concentric with the circumference of the optical storage medium.

13. The method of calim 12, wherein the optically detectable marks comprising the band are uniformly spaced.

14. The method of claim 12, wherein the optically detectable marks comprising the band are spaced sufficiently far apart to be detectable by an optical system achieving a predetermined largest expected focus spot.

15. The method of claim 12, wherein interpreting the optically detectable marks to identify the type of the optical storage medium comprises measuring the spacing of the optically detectable marks comprising the band.

16. The method of claim 11, wherein interpreting the optically detectable marks to identify the type of the optical storage medium comprises measuring at least one dimension of the optically detectable marks.

17. The method of claim 11, wherein the type comprises at least one of CD, DVD, Blu-ray, and AOD.

18. An optical device, comprising: an optical system to read, from a non-user-data area of an optical storage medium having a particular type, a plurality of optically detectable marks that indicate said type and that are readable by a plurality of different optical systems configured for different types of optical storage media; and logic configured to interpret the at least one optically detectable mark to determine said type of the optical storage medium.

19. The optical device of claim 18, wherein the optical device comprises at least one of a DVD device, a CD device, a Blu-ray device, an AOD device, and a computer optical drive.

20. An optical device, comprising: means for reading, from a non-user-data area of an optical storage medium having a particular type, a plurality of optically detectable marks that encode said type and that are readable by a plurality of different optical systems configured for different types of optical storage media; and interpreting logic to interpret the at least one optically detectable mark to determine said type of the optical storage medium.

21. An optical storage medium comprising:
   a disk-like body having a particular type and comprising a central aperture and a data area configured to store data in a binary format along circular tracks;
   a plurality of optically detectable marks on the disk-like body arranged in a curved pattern at least partially around the central aperture, the plurality of optically detectable marks outside the data area, and the plurality of optically detectable marks encode said type in the sequentially arrangement of the marks along the curved pattern;
   the plurality of optically detectable marks configured to be readable, as the disk-like body rotates, by both:
      an optical pickup unit configured to read a data area of an optical storage medium that cannot focus on the data area of the disk-like body; and
      an optical pickup unit configured to read a data area of an optical storage medium that can focus on the data area of the disk-like body;
   wherein each of optically detectable marks that indicate said type of the disk-like body are larger than optically detectable marks in the data area.

22. The optical storage medium of claim 21 wherein each optically detectable mark has radial size configured to be readable by the optical pickup unit in the absence of radial tracking.

23. The optical storage medium of claim 21 wherein at least one optically detectable mark has a width, measured along the curved pattern, of from 1 to 3 millimeters.

* * * * *

UNITED STATES PATENT AND TRADEMARK OFFICE
CERTIFICATE OF CORRECTION

PATENT NO. : 8,339,920 B2
APPLICATION NO. : 10/618115
DATED : December 25, 2012
INVENTOR(S) : Charles R. Weirauch Page 1 of 1

It is certified that error appears in the above-identified patent and that said Letters Patent is hereby corrected as shown below:

In the Claims:

In column 6, line 43, in Claim 10, after "marks" delete "are".

In column 6, line 60, in Claim 13, delete "calim" and insert -- claim --, therefor.

Signed and Sealed this
Sixteenth Day of April, 2013

Teresa Stanek Rea
*Acting Director of the United States Patent and Trademark Office*